United States Patent [19]
Worden

[11] 3,872,574
[45] Mar. 25, 1975

[54] METHOD OF FABRICATING A GLASS LAMPSHADE

[76] Inventor: Howard L. Worden, P.O. Box 519, Granger, Wash. 98932

[22] Filed: Aug. 13, 1973

[21] Appl. No.: 387,929

[52] U.S. Cl.................... 29/469, 29/464, 240/108
[51] Int. Cl............................................ B23p 23/00
[58] Field of Search................ 29/464, 469; 33/9 R; 240/108 R, 108 A, 108 B; D80/8

[56] References Cited
UNITED STATES PATENTS

| | | | |
|---|---|---|---|
| 901,690 | 10/1908 | Crooke | 240/109 |
| 924,457 | 6/1909 | Handel | 240/109 |
| 928,340 | 7/1909 | Steffin | 240/109 |
| 1,041,938 | 10/1912 | Young | 240/109 |
| 1,545,369 | 7/1925 | Tizley | 240/108 B |
| 2,304,458 | 12/1942 | Hauskind | 240/108 R |
| 3,675,008 | 7/1972 | Hill | 240/108 R |
| 3,757,110 | 9/1973 | Soboleski | 240/108 R |
| R16,560 | 2/1927 | Huck et al. | 240/108 R |

Primary Examiner—C. W. Lanham
Assistant Examiner—James R. Duzan
Attorney, Agent, or Firm—Seed, Berry, Vernon & Baynham

[57] ABSTRACT

A form for making a glass lampshade constructed by cutting a solid mold having an outer surface of a desired configuration into a pie-shaped section, shaping it so that it will stand on a table with the curved surface uppermost and placing a pattern upon the section of the form. The glass lampshade is constructed using the form by the method of placing colored glass or the like upon the form in conformance with the pattern and securing the glass sections together in a manner well known in the art. Following the completion of one section, an identical section is formed using the same form, and this process is repeated until a sufficient number of sections are fabricated to form an entire shade. The sections are then secured together to complete the shade.

2 Claims, 6 Drawing Figures

PATENTED MAR 25 1975 3,872,574

METHOD OF FABRICATING A GLASS LAMPSHADE

BACKGROUND OF THE INVENTION

Tiffany-type lamp shades made popular by the Tiffany Studios of New York around the turn of the century have again received an upsurge of popularity. Tiffany lamp shades, as fabricated by professionals and presently marketed, are quite expensive. Many individuals have taken up the fabrication of Tiffany-type shades as a hobby, thereby producing their own lamp shades at far less cost. Very close approximations to the original Tiffany-type shades can be made very successfully by a person of reasonable talent and skill. Companies now provide the home-fabricator with molds and/or cut pieces of glass to fit a given pattern making the entire process quite feasible. One of the drawbacks of the present method of fabricating Tiffany-type lamp shades from kits in the home is that the molds are very expensive and bulky. The molds and method presently utilized must be located on a table so that the fabricator can work on all sides of the form as he progresses or, alternatively, be able to rotate the table so that all sides of the form are, at one time or another, in front of the hobbyist.

In addition to the prior art, as noted above, other methods of making lamp shades are disclosed in U.S. Pat. No. 793,613, granted to Crooke, Aug. 1, 1905, which discloses a method of fabricating an imitation leaded glass frame in sections; U.S. Pat. No. 901,690 granted to Crooke in 1908 which discloses a slight modification to his 1905 patent; U.S. Pat. No. 924,457, granted to Handel on June 8, 1909 which discloses making a lamp shade of sections and the method of securing the sections together; U.S. Pat. No. 1,335,640 granted to Beals Mar. 30, 1920 which discloses a sectional lamp shade and a method of securing the sections together; U.S. Pat. No. 2,304,458 granted Dec. 8, 1942 to Hauskind, which discloses making a lamp shade by the process of adhering translucent material to a layer of flexible material; and U.S. Pat. No. 3,675,008, granted July 4, 1972 to Hill which discloses a method which utilizes a plastic shell upon which elongated members are stacked in interleaved relation to form the completed shade. These references, although dealing with a method of fabricating lamp shades utilizing a sectional approach, do not provide the hobbyist with a method of fabricating a Tiffany-type shade in a simple, economical fashion.

With the above-known prior art and problems in mind, it is an object of the present invention to provide a method of forming a Tiffany-type lamp shade which is inexpensive and well within the scope of a person of ordinary manipulative skill.

Another object of the present invention is to provide a mold upon which a Tiffany-type lamp shade may be fabricated, a mold which may be placed upon a supporting surface in front of the fabricator and utilized to fabricate one complete section of the Tiffany-type shade at a time and then reused to form an identical section. The plurality of sections are then joined together to form a complete shade.

It is still another object of the present invention to provide a method for forming a Tiffany-type lamp shade comprising the steps of fabricating a plurality of identical sections and then securing the sections together to form the completed shade. Each of the sections formed is identical and sequentially formed upon the same mold.

Yet another object is to provide a Tiffany-type lamp shade fabricated by the method described hereinafter in detail.

DETAILED DESCRIPTION OF THE DRAWINGS

Figure 1:
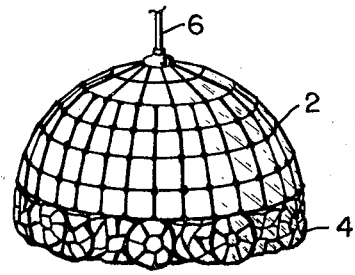
FIG. 1 is an illustrative view of a typical Tiffany-type shade which could be fabricated by the method described herein.

As can be seen in FIG. 1, a Tiffany-type lamp includes a curved shade 2 generally fabricated of a plurality of small pieces of glass which are secured together by use of copper foil, lead came or other methods to form the shape and design desired. Oftentimes the shade has a contrasting lower border 4 and obviously has the required electrical connection and suspenseion means 6.

Figure 2:
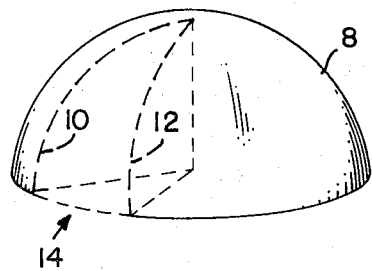
FIG. 2 is a mold upon which the Tiffany-type shade may be fabricated, depicting the section to be removed for utilization of the present method.

The method of fabricating the lamp in accordance with the present invention includes taking a mold 8 (see FIG. 2) which would conform to the gereral shape of the lamp shade as desired. The mold is then cut into a pie-shaped piece along lines 10 and 12 and the pie-shaped piece removed. The remainder of the mold can be utilized for other pie-shaped pieces which can be handled in exactly the same manner as hereinafter described. The utilization of a pie-shaped piece as described hereinafter allows a single mold 8, which may be expensive, to be utilized by a plurality of hobbyists or lamp makers and each piece to be used more than once.

Figure 4:
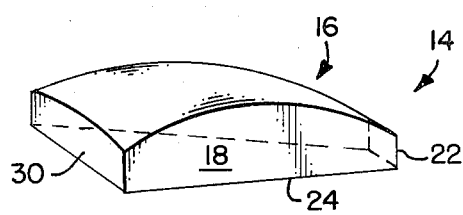
FIG. 4 is a depiction of the section of the mold in use and lying flat on the table.
Figure 3:
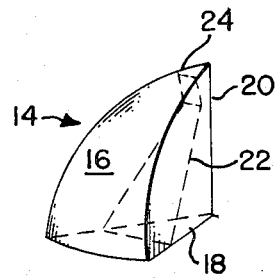
FIG. 3 is a showing of the section removed with the lines indicating a portion of the section to be removed so the section will be stable while used.

Referring now to FIG. 3, the pie-shaped piece 14 has a curved outer surface 16 and a pair of side surfaces 18 which converge at a point 20. To place the mold in a condition to be utilized in the present invention, the tip of the pie-shaped piece is removed as along lines 22–24, thus leaving a configuration as seen in FIG. 4. This functional piece has generally flat sides 18, a foreshortened frontend portion 22, a curved upper portion 16 and a flat bottom portion 24 upon which the mold 14 rests during the fabrication of the lamp shade itself.

As seen in FIG. 4, the completed partial mold 14, which is utilized to fabricate a section of the completed lamp shade, has placed thereon a pattern or design (not shown) such that the hobbyist or fabricator can follow the design when working upon his particular shade and place pieces of glass upon the mold 14 in accord with the pattern.

Figure 5:
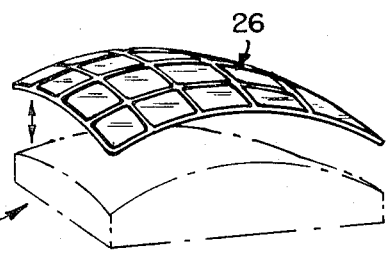
FIG. 5 is a depiction of a completed section of the lamp shade being removed from the mold section.

Referring now to FIG. 5, the mold 14 is shown in phantom and, as can be seen, a plurality of glass pieces have been placed upon the top of the mold 14 in accordance with the pattern established in FIG. 4. The glass pieces are secured in position by means of copper foil, lead came or other satisfactory methods. The finished section 26, although fabricated of a plurality of small pieces, is a rigid section which conforms to the curvature of the mold 14 and will be set aside while the artisan fabricates a second, third, fourth and however many sections are necessary to complete the lamp shade.

Figure 6:
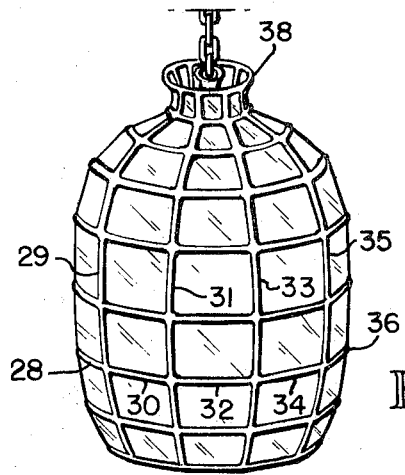
FIG. 6 is an illustration of a tulip shaped lamp shade fabricated by the present method.

After completing a sufficient number of identical sections, as described hereinabove, the fabricator then joins the sections to form a completed shade as shown in FIG. 6. As seen in this figure, the sections designated by reference numerals 28, 30, 32 and 34 are joined by joining means along lines 29, 31, 33 and 35.

The means whereby the sections 28, 30, 32 and 34 are joined will be compatible with the means whereby the individual glass pieces have been connected together to form the section 26 such that when completed it will be virtually impossible to tell that the lamp shade was not fabricated as one solid single unit.

It is to be noted in FIG. 6 that the lamp shade has a complex curved structure and flares outwardly at the upper portion 38. The structure is noted to also be a tulip-shaped configuration wherein the bottom of the lamp shade is turned inwardly. Configurations of this nature are simply and quickly made upon the mold and by the method hereinabove described. If the person were to attempt to fabricate the entire shade with these complex curvatures as a unit upon a single mold he would either have to destory the mold to remove the glass or not be able to fabricate the shade desired.

As can readily be seen, the hereinabove described method allows a home hobbist or even a professional to make very distinctive, attractive Tiffany-type lamp shades without the requirement of special expensive equipment. Further, he is capable of fabricating a lamp with a complex curve without destroying his mold.

The embodiments of the invention in which an exclusive property or privilege is claimed are defined as follows:

1. A method of constructing a lamp shade or the like comprising:
   Fabricating a plurality of segments of the shade by the steps of:
   placing a form which represents a segment of the completed shape upon a supporting surface,
   placing a plurality of discrete pieces upon the segment of the form,
   securing the discrete pieces to each other to form a rigid segment of the shade,
   removing the segment of the shade from the segment of the mold,
   securing a plurality of segments of the shade to each other to form a complete shade.

2. The method as in claim 1 and further including the step of securing a pattern upon the segment of the form prior to placing the discrete pieces thereon.

\* \* \* \* \*

UNITED STATES PATENT OFFICE
CERTIFICATE OF CORRECTION

Patent No. 3,872,574　　　　　　　　Dated　March 25, 1975

Inventor(s)　　Howard L. Worden

It is certified that error appears in the above-identified patent and that said Letters Patent are hereby corrected as shown below:

In the claims, claims 1 and 2 should read as follows:

1. A method of constructing a lampshade or the like comprising:
   (a) fabricating a plurality of segments of the shade by the steps of:
       placing a partial form which represents an integral segment of the completed shade upon a supporting surface,
       placing a plurality of discrete pieces upon the partial form,
       securing the discrete pieces to each other to form a rigid segment of the shade,
       removing the segment of the shade from the partial form, and
   (b) securing a plurality of segments of the shade to each other to form a complete shade.

2. The method as in claim 1 and further including the step of securing a pattern upon the partial form prior to placing the discrete pieces thereon.

Signed and Sealed this thirtieth Day of March 1976

[SEAL]

Attest:

RUTH C. MASON
Attesting Officer

C. MARSHALL DANN
Commissioner of Patents and Trademarks